United States Patent
Black

(10) Patent No.: US 8,116,714 B2
(45) Date of Patent: Feb. 14, 2012

(54) USE OF POWERLINES FOR TRANSMISSION OF HIGH FREQUENCY SIGNALS

(75) Inventor: William C. Black, Ames, IA (US)

(73) Assignee: Northern Microdesign, Inc., Ames, IA (US)

( * ) Notice: Subject to any disclaimer, the term of this patent is extended or adjusted under 35 U.S.C. 154(b) by 987 days.

(21) Appl. No.: 12/048,820

(22) Filed: Mar. 14, 2008

(65) Prior Publication Data

US 2010/0150215 A1 Jun. 17, 2010

Related U.S. Application Data

(60) Provisional application No. 60/894,756, filed on Mar. 14, 2007.

(51) Int. Cl.
*H04J 3/00* (2006.01)
(52) U.S. Cl. ......... 455/280; 455/117; 455/129; 455/217
(58) Field of Classification Search .................. 455/103, 455/117, 127.1, 127.5, 128, 129, 217, 280, 455/344, 347
See application file for complete search history.

(56) References Cited

U.S. PATENT DOCUMENTS

| | | | |
|---|---|---|---|
| 4,724,381 A | 2/1988 | Crimmins | |
| 6,130,896 A | 10/2000 | Lueker et al. | |
| 6,243,413 B1 | 6/2001 | Beukema | |
| 6,689,953 B2 * | 2/2004 | Baldwin | 174/50 |
| 7,148,799 B2 * | 12/2006 | Cern et al. | 340/538.16 |
| 7,443,154 B1 | 10/2008 | Merewether et al. | |
| 7,463,877 B2 * | 12/2008 | Iwamura | 455/402 |
| 2007/0179721 A1 | 8/2007 | Yaney | |
| 2008/0259827 A1 * | 10/2008 | Sung et al. | 370/281 |
| 2008/0309376 A1 * | 12/2008 | Song et al. | 327/2 |
| 2009/0134996 A1 | 5/2009 | White, II et al. | |

OTHER PUBLICATIONS

Meng, J. et al., "A Comparison Study of Three Power-Line Communication Techniques in Low Signal-to-Noise Ratio Conditions", Iowa State University downloaded Mar. 4, 2010, IEEE #1-4244-1090-8/07, pp. 407-412.
NTIA Report 04-413, "Potential Interference From Broadband Over Power Line (BPL) Systems to Federal Government Radiocommunications at 1.7-8.0 MHz", vol. II, U. S. Department of Commerce, pp. 1-153.
Bilal, Osama et al., "Design of Broadband Coupling Circuits for Powerline Communication", 5 pages, www.isplc2004.unizar.es/OSAMA%20BILAL.pdf, Mar. 14, 2008.
Hare, Ed, "Exhibit A: Summary of ARRL Studies of BPL Field Trial Areas", Aug. 19, 2003, pp. 1-9.
Hare, Ed, "Power Lines as Antennas From 100 kHz to 50 MHz" Jul. 7, 2003, pp. 1-4.
"Broadband Over Power Line (BPL) and Amateur Radio", 10 pages, ARRLWeb: www.arrl.org/tis/info/HTM:L/plc/ Mar. 14, 2008.
"HomePlug Powerline Alliance" web page: www.homeplug.org/home, 1 page, Mar. 14, 2008.
International Search Report, PCT/US2010/026346, listing relevant art cited by the International Searching Authority, Oct. 29, 2010.

* cited by examiner

*Primary Examiner* — Nhan Le

(57) ABSTRACT

Communication is provided which includes receiving a transmitted radio signal at a powerline wherein the powerline functions as a receiving antenna for the wirelessly transmitted radio signal. The powerline is coupled to an input of a radio receiver using a coupler to communicate the radio signal to the radio receiver. For calibration purposes a second antenna not coupled to powerline may be used. A method for powerline communication across transformers, open circuit breakers, and other devices is also provided. In addition, a method of monitoring a device connected to a powerline is provided.

20 Claims, 17 Drawing Sheets

USE OF POWERLINES FOR TRANSMISSION OF HIGH FREQUENCY SIGNALS

CROSS-REFERENCE TO RELATED APPLICATIONS

This application claims priority under 35 U.S.C. §119 to provisional application Ser. No. 60/894,756 filed Mar. 14, 2007, herein incorporated by reference in its entirety.

GRANT REFERENCE

This application was made with Government support under Contracts W31P4Q-05-C-R067 and W31P4Q-06-C-0221, awarded by the U.S. Army Aviation and Missile Command. The Government has certain rights in the invention.

BACKGROUND OF THE INVENTION

The present invention relates to the use of powerlines for transmission of high frequency signals. More particularly, but not exclusively, the present invention relates to the use of powerlines: in wireless communications where the powerlines are used as antenna; the communication of signals across transformers, open circuits or other devices associated with powerlines; and monitoring powerline noise to determine information about devices connected to a powerline. To assist in explanation of the present invention, problems associated with powerlines are discussed. Such problems may seem unrelated, without the benefit of this disclosure.

Generally, it is known to use powerlines for communications, such as may be used for home networking or other purposes. In such a network, computers or other network devices are interfaced to an outlet of the powerline and communications signals are sent over the power line. The powerline signals typically have a frequency of 60 Hz so a high pass filter can be used to filter out the 60 Hz. The communications signals sent over the power line are substantially higher such as on the order of 4 to 24 MHz. U.S. Pat. No. 6,243,413 to Beukema discloses one such example of using powerlines for communications. Various HomePlug® devices exist from multiple manufacturers. One problem exhibited by various examples of such devices is that such devices do not demonstrate adequate surge survivability. U.S. Pat. No. 6,130,896 to Luker et al. discloses another example of such a use of powerlines for communications. Luker et al. further discloses that a device connected to the powerlines may also be connected to an access point with an antenna for providing wireless communication.

Another problem related to communications over powerlines is the effect of open circuits, equipment such as transformers, or other devices or signals transmitted across the powerlines. Communications over powerlines may not be viable in certain applications unless effects of open circuits, equipment such as transformers, or other devices can be managed.

A seemingly unrelated problem is failure of devices connected to power lines, such as, but not limited to, transformers. Failure of such devices may result in disruptions of service. It would be advantageous if failure of such devices could be predicted prior to its occurrence so that devices could be repaired or replaced prior to failure.

Another seemingly unrelated problem relates to worker safety in large structures and mines. In the event of a disaster such as a structural failure or mine cave-in, locating workers as expeditiously as possible becomes a primary concern. Yet doing so can be difficult for a variety of reasons and presents a more complex set of problems than is present in other location finding applications. For example, services such as GPS are not options because the workers within certain structures, especially metal structures or workers who are underground have no line-of-sight to either GPS satellites or other workers. Radio signals become highly attenuated which makes it impractical to use conventional approaches. What is needed is a way to locate workers trapped within a large structure or in a mine.

BRIEF SUMMARY OF THE INVENTION

It is a primary object, feature, or advantage of the present invention to improve over the state of the art.

It is a further object, feature, or advantage of the present invention to use powerlines as antenna in wireless communication.

It is a still further object, feature, or advantage of the present invention to provide for a means of calibrating for different powerline networks.

Yet another object, feature, or advantage of the present invention is to provide a device that interacts with powerlines and provides adequate surge survivability.

A still further object, feature, or advantage of the present invention is to provide a method for powerline communication across transformers, open circuit breakers, and other devices.

Yet another object, feature, or advantage of the present invention is the characterization of devices connected to a power-line using an analysis of high frequency impedance.

Another object, feature, or advantage of the present invention is to assess the reliability or state of a transformer or other powerline equipment.

One or more of these and/or other objects, features, or advantages of the present invention will become apparent from the specification and claims that follow.

Wireless communication may occur using the powerlines as one or potentially more than one antenna over both conventional powerline communication frequencies, and much higher frequencies (including frequencies above 100 MHz) using either conventional radio, software defined radio and either conventional or subsampling reception techniques. Furthermore, wireless nodes and wired nodes may interoperate with each other using potentially the same signaling methods.

According to one aspect of the present invention a method of wireless communication is provided. The method includes receiving a wirelessly transmitted radio signal at a powerline wherein the powerline functions as a receiving antenna for the wirelessly transmitted radio signal. The method further includes coupling the powerline to an input of a radio receiver using a coupler to communicate the radio signal to the radio receiver. The coupler provides for blocking the alternating current power signal while limiting radio frequency loss and providing surge protection. The method may further include sending a second radio signal from a radio transmitter through the coupler and to the powerline wherein the powerline functions as a sending antenna for the second radio signal. The method may further include calibrating the radio receiver for use with the powerline by comparing performance of the powerline with a second antenna.

According to another aspect of the present invention a system is provided. The system includes a radio receiver having an input, an optional power attenuator electrically connected to the radio receiver input and a line coupler electrically connected to the power attenuator and to a power line, the power line providing an alternating current line level voltage and wherein the powerline functions as an antenna for the radio receiver. The optional power attenuator may be used for measuring the S-parameters of the power-line unless there is also a transmit/receive (T/R) switch or other means of changing the attenuation such that the attenuation is at a minimum when the system is listening to a remote transmitter. The system may further include a radio transmitter having an output and a power amplifier electrically connected to the output of the radio transmitter and the line coupler and wherein the power line function as an antenna for the radio transmitter. The radio receiver may further include a second input and an antenna electrically connected to the second input of the radio receiver to thereby provide data for use in calibration or other purposes.

According to another aspect of the present invention, a system is provided. The system includes a radio transmitter having an output, and a line coupler electrically connected to the transmitter output and to a power line, the power line providing an alternating current line level voltage and wherein the powerline functions as an antenna for the radio transmitter.

According to another aspect of the present invention, a method for powerline communication across transformers, open circuit breakers, and other devices is provided. The method includes providing a signal at a signal output, the signal at a frequency selected to reduce loss over a communication path that includes one or more transformers or open circuit breakers, coupling the powerline to the signal output at a first location using a coupler to communicate the signal over the powerline, and receiving the signal at a second location, the second location separated from the first signal by the communication path.

According to another aspect of the present invention, a method of monitoring a device connected to a powerline is provided. The method includes monitoring powerline noise across the power line and analyzing high frequency impedance associated with the powerline noise to determine information about the device.

According to another aspect of the present invention, a method for enhancing worker safety is provided in large structures and mines. The method includes equipping a worker with a beacon device, the beacon device adapted for wirelessly communicating a beacon signal identifying the beacon device or the worker. The method further includes receiving the beacon signal at a powerline wherein the powerline functions as a receiving antenna for the beacon signal and coupling the powerline to an input of a radio receiver using a coupler to communicate the beacon signal to the radio receiver. The method also provides for determining location of the beacon device at least partially based on the beacon device.

DETAILED DESCRIPTION OF THE PREFERRED EMBODIMENT

The present invention provides for wireless communications to occur using powerlines as one or potentially more than one antenna over both conventional powerline communication frequencies, and much higher frequencies, above 100 MHz using either conventional radio, software defined radio and subsampling reception techniques. Furthermore, wireless nodes and wired nodes may interoperate with each other using potentially the same or alternate signaling methods.

Figure 1A:
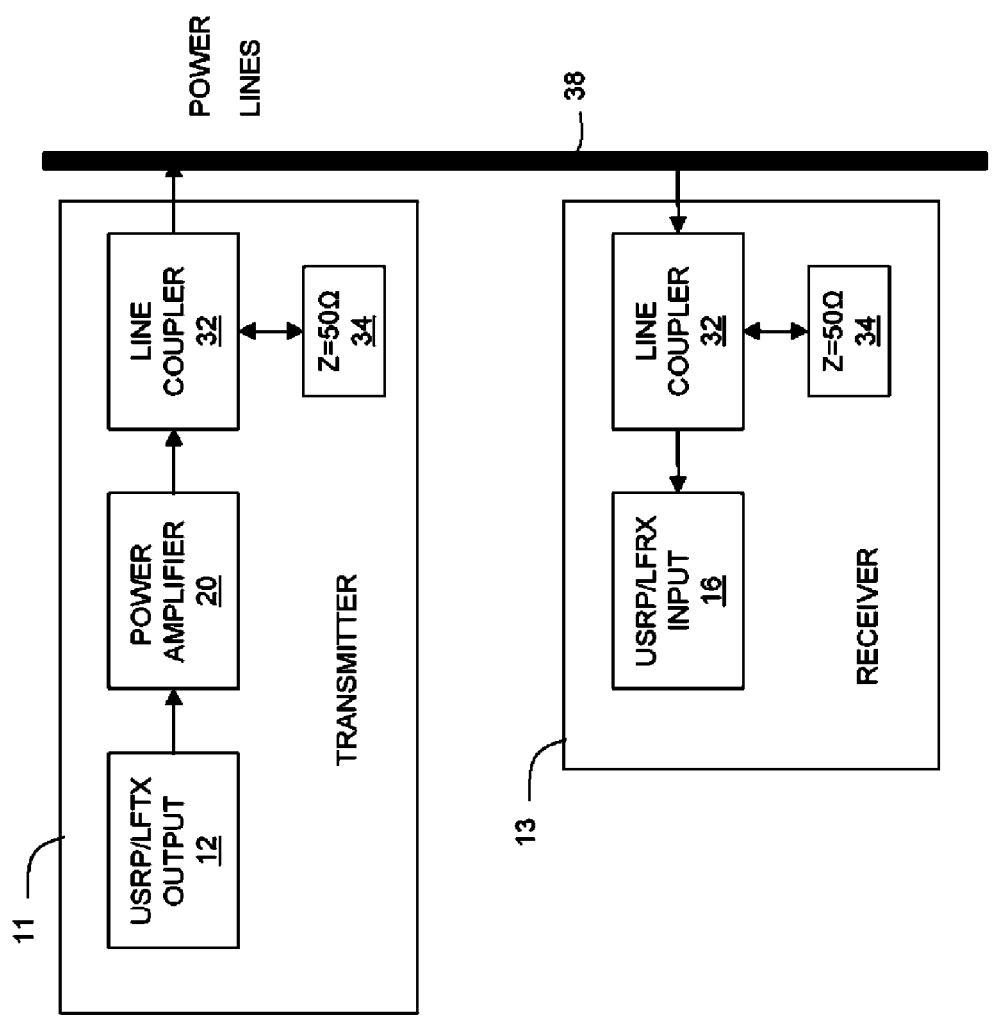
FIG. 1A is a block diagram illustrating use of powerlines in wireless communications.

FIG. 1A provides a block diagram illustrating the use of powerlines in communications. A transmitter 11 is coupled to powerlines 38 and a receiver 13 is coupled to power lines 38. An output 12 is electrically connected to a power amplifier 20. The power amplifier 20 is electrically connected to a line coupler 32 which is coupled to the power lines. The coupler 32 may also be electrically connected to an optional impedance 34. In the receiver 13, the powerlines 38 are electrically coupled to a line coupler 32 which may be electrically connected to an optional impedance 34. The line coupler 32 is electrically connected to an input 16 of the receiver 13.

Figure 1B:
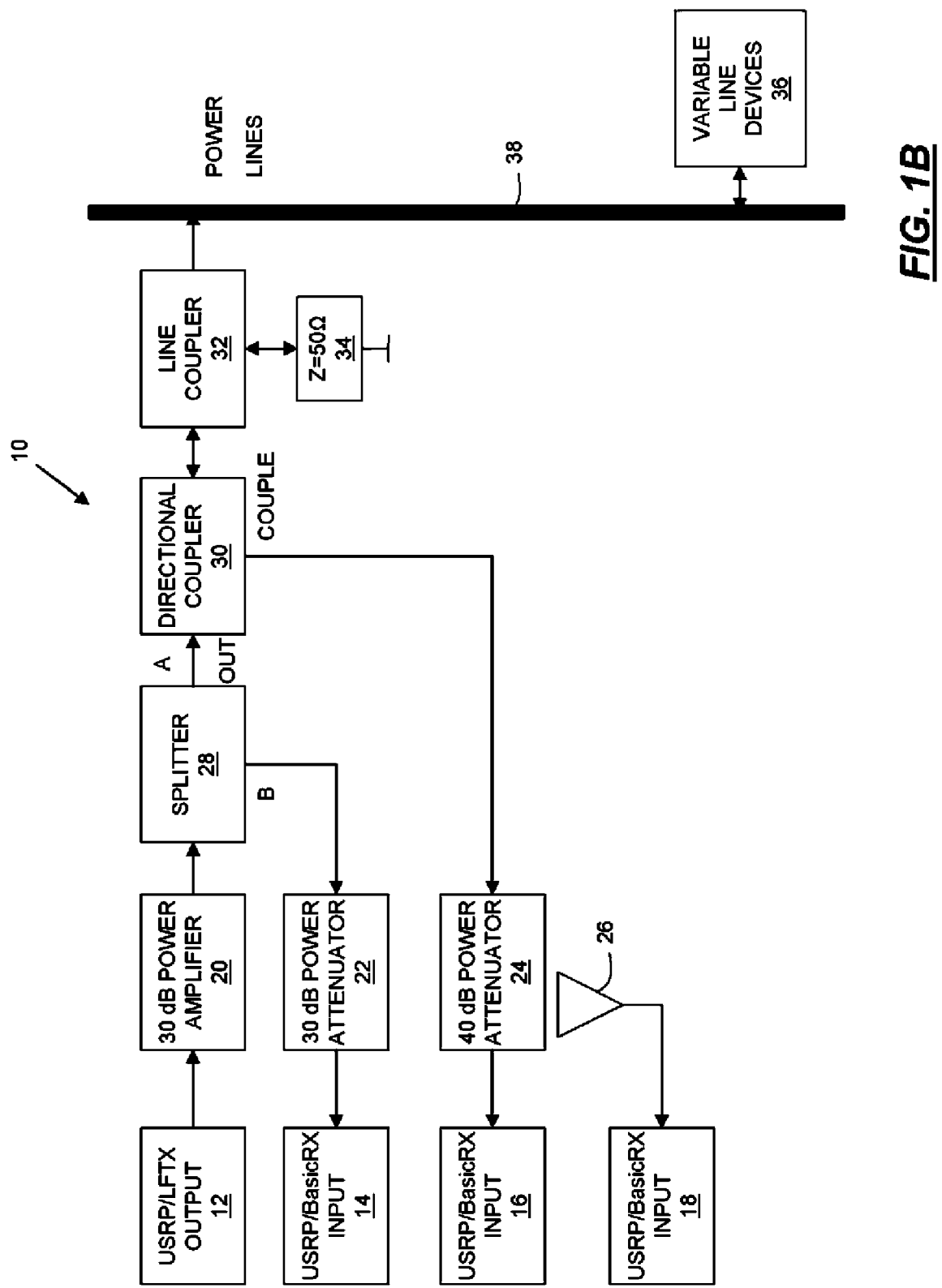
FIG. 1B is a block diagram illustrating one embodiment of a system using powerlines in wireless communications.

FIG. 1B illustrates one embodiment of a system 10 which uses powerlines in communications or for measuring characteristics of devices attached to the powerlines. As shown in FIG. 1B, system 10 associated with a software defined radio system (SDR) Universal Software Radio Peripheral (USRP) is provided. The USRP is one example of a high speed USB based board for making software radios and is available from Ettus Research LLC. The radio used need not be a software radio. A USRP or low frequency transmitter (LFTX) output 12 is shown. The USRP/LFTX output 12 is electrically connected to an amplifier such as a 30 dB power amplifier 20. The 30 dB power amplifier 20 is electrically connected to a splitter 28, which splits the signal into a first output, A, and a second output, B. The second output B, is electrically connected to an attenuator such as a 30 dB power attenuator 22 which is electrically connected to a USRP or basic receiver input 14. The first output A from the splitter 28 is electrically connected to a directional coupler 30. The directional coupler is electrically connected to a 40 dB power attenuator 24 which is electrically connected to a USRP or basic receiver input 16. The directional coupler 30 is also electrically connected to a line coupler 32. The line coupler 32 is electrically connected to an impedance 34 of approximately 50 ohms or may alternately be connected to a receiver input, such as block 18 or may be left open. The line coupler 32 is coupled to a power line 38. One or more variable line devices 36 may be electrically connected to the power line 38. Thus, the powerline 38 may be used as an antenna coupled to the system 10 shown. In addition the powerline is used in its conventional manner, namely to provide alternating current at or near a standardized voltage level and at or near a standardized frequency. One example of such a standardized voltage level is 120 VAC operating at 60 Hz. Of course, such a voltage level is approximate only and may vary somewhat as is well known in the art.

A second receiver input 18 is also shown. The second receiver input 18 is electrically connected to an antenna 26. Different powerline networks in different buildings or buildings type may exhibit differences in behavior for various reasons. As will later be explained in more detail, the antenna 26 may be used in the system 10 to provide assistance in calibrating the system 10 or for other purposes.

The configuration of FIG. 1B provides for a software defined radio system (SDR) Universal Software Radio Peripheral (USRP) system with a directional coupler and splitter to perform the vector network analysis (VNA) function whereby the characteristic impedance and scattering parameters of the power line may be measured. The present invention has also obtained transmission via an antenna that is placed within the same room as the line coupler. Comparing measurements of when the receiver connection was open and those where it was attached to the antenna, one can infer the actual wireless transmission between the power line and the freestanding antenna.

Figure 2:
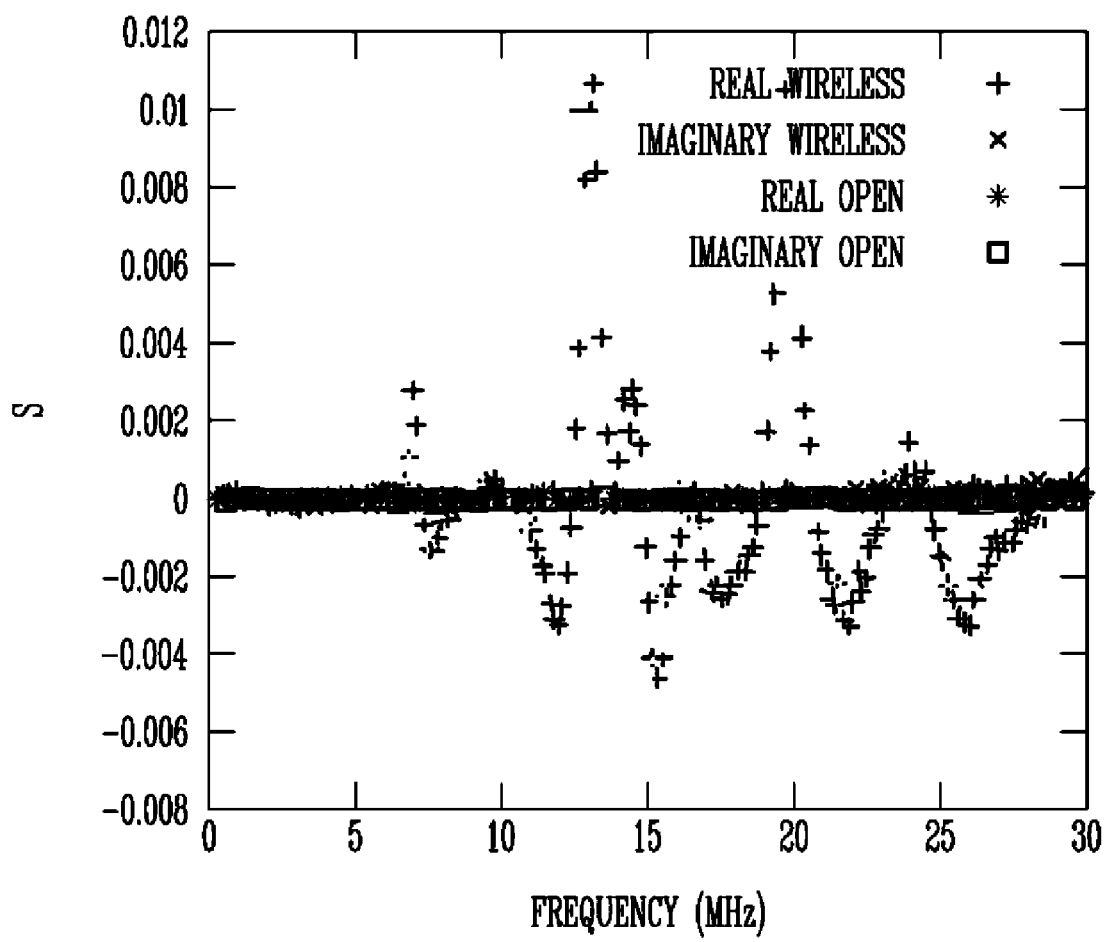
FIG. 2 is a chart illustrating measured transmission ($S_{21}$) from the power line to an ~3 ft. antenna placed within the room.
Figure 3:
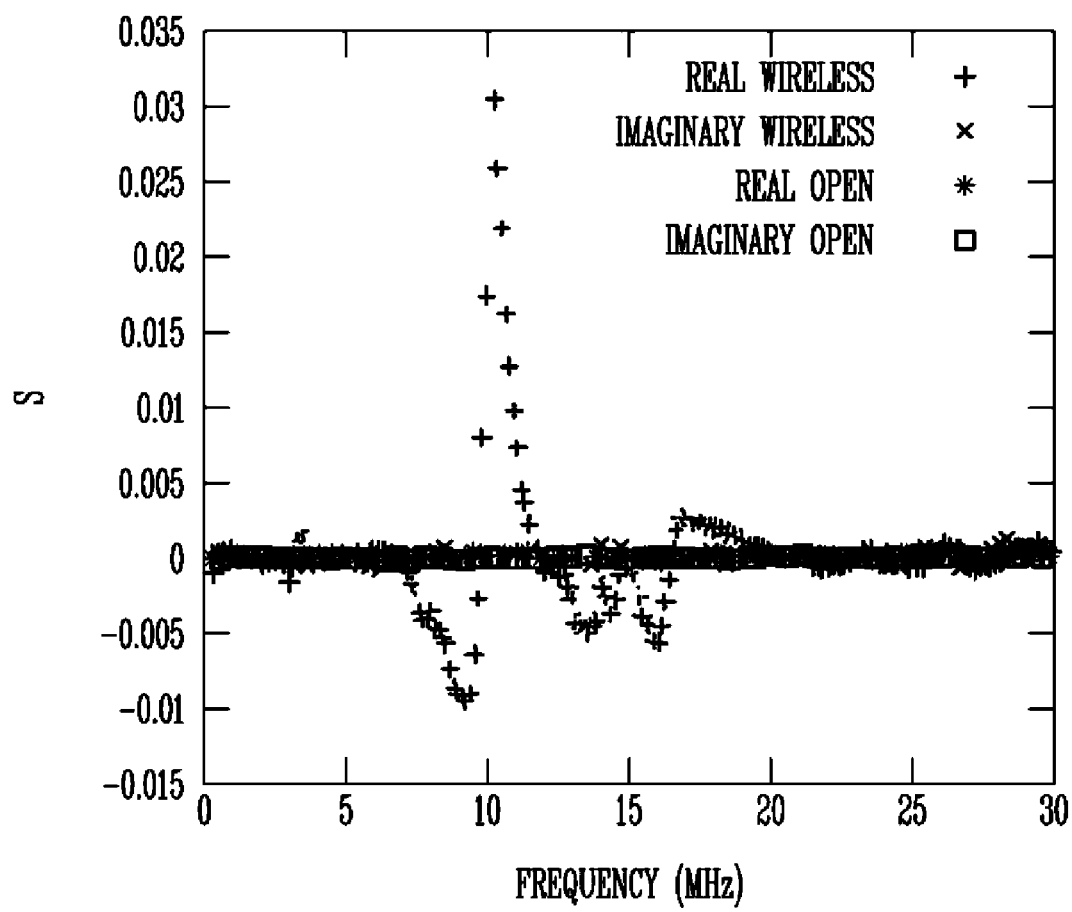
FIG. 3 is a chart illustrating measured wireless transmission ($S_{21}$) from the power line in an outbuilding.
Figure 4:
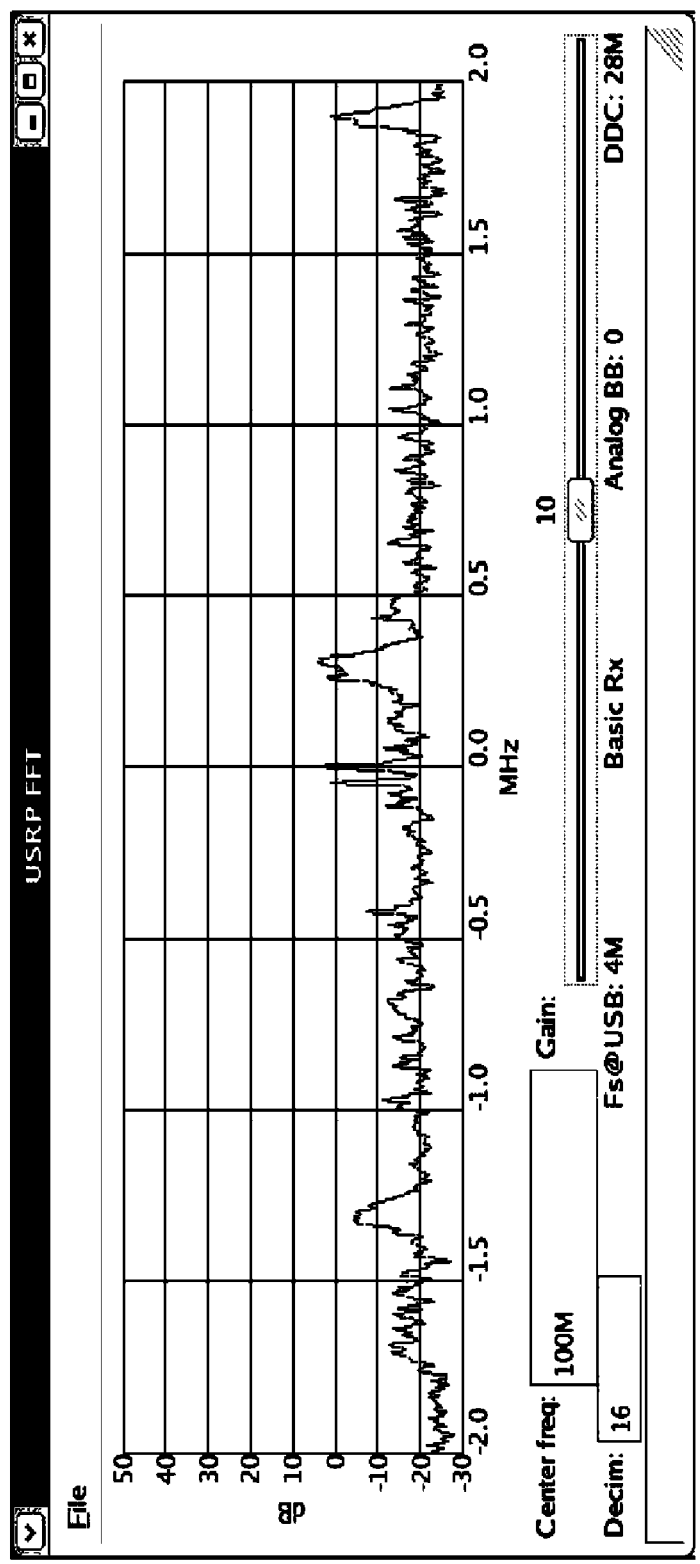
FIG. 4 illustrates captured spectrum near 100 MHz (subsampled) using an external antenna.
Figure 5:
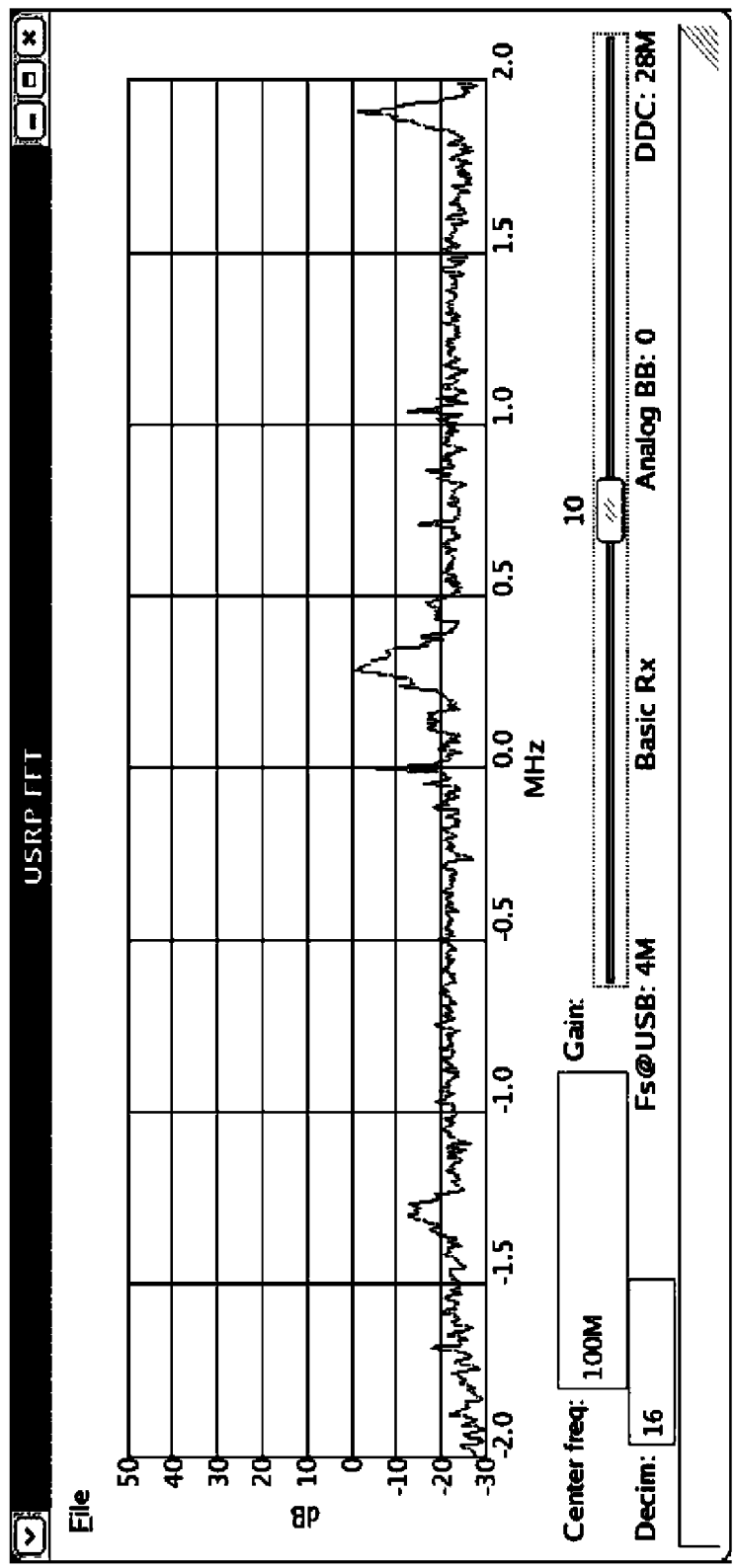
FIG. 5 illustrates captured spectrum near 100 MHz (subsampled) using a line coupler plugged into the power line.

Examples of wireless measurements taken with this setup are shown in FIG. 2 and FIG. 3 for two different buildings at a location north of Ames, Iowa USA. Note that both plots include data with open antenna connections so as to infer coupling from board or chip level crosstalk that is very small relative to the received signals. For some frequencies the magnitude of coupling via the antenna is comparable to that with an additional line coupler. Thus, wireless mesh nodes could be interspersed with wired nodes, should the usual electrical connection not be possible or desirable. The USRP VNA function is limited to about 30 MHz but we have noticed that wireless coupling on and off the powerlines is significant at even commercial FM frequencies including those over 100 MHz. The USRP can receive these frequencies using a BASIC RX front-end (with no anti-aliasing filter) and using the A/D in a sub-sampling mode. The BASIC RX is one example of a daughterboard available for USRP. Hence, data can be received from even sub-carriers riding along with commercial FM broadcasts. Examples of FM band reception are shown in FIG. 4 and FIG. 5. For FIG. 4 the same broadband antenna used for FIG. 2 and FIG. 3 was used, but now the USRP was tuned to around 100 MHz (subsampled). In FIG. 5, the antenna was replaced with a line coupler revealing much of the same spectral structure.

As shown in FIG. 1B, the line coupler 32 is coupled to a power line 38. Coupling of RF signals on or off the powerlines must be done in such a way so as to block the 120 VAC present on the lines but also minimize RF loss. This is particularly challenging because the coupler must also perform a surge protection function that must minimize the impact of lightning induced or other transients from significantly disrupting communications or damaging equipment. For particularly long-term installations, the importance of adequate surge survivability is clearly important, and is reportedly a significant shortcoming of some commercial HomePlug® devices. Attenuation may be performed by attenuators. The attenuation is primarily used to protect it from a local transmitter. Instead of a power attenuator between the line coupler and the receiver input a transmit/receive (T/R) switch may be used or other means of changing the attenuation such that attenuation is at a minimum when the system is listening to a remote transmitter. One may want to attenuate when the local transmitter is operating, especially if there is a power amplifier present which may damage the receiver.

Figure 6:
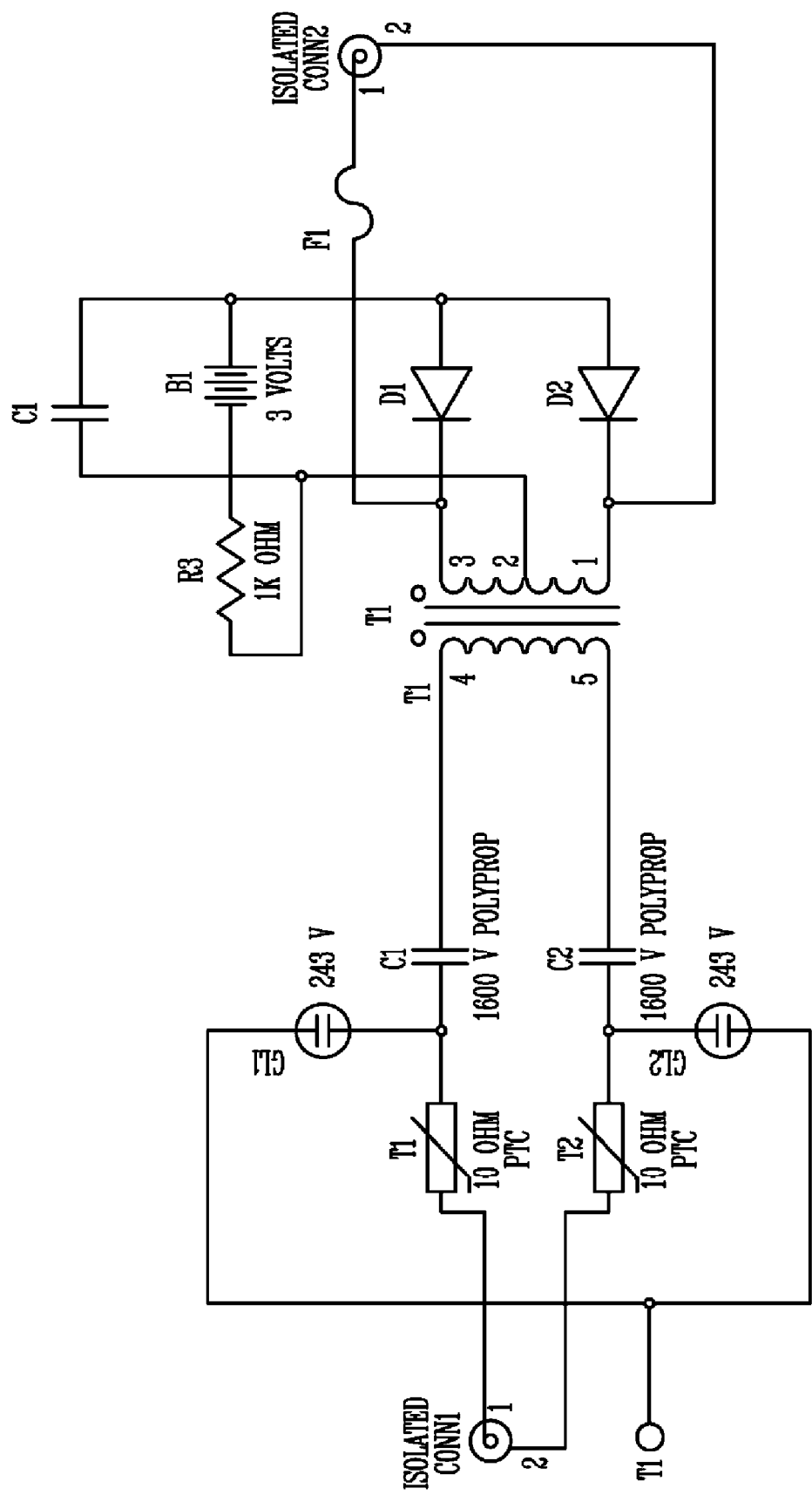
FIG. 6 is a schematic of one embodiment of a powerline coupler.

Several variations of couplers were designed and prototyped with one version being shown in the schematic of FIG. 6. Earlier prototypes had used more traditional surge protectors including MOV devices and/or silicon chip or discrete Schottky diodes but all of these methods exhibited an unacceptable frequency response with dips in the frequency response of 30 dB or more below 100 MHz. In contrast, the unit shown in FIG. 6 is useful to beyond 150 MHz and shows only a few dB of loss to beyond 100 MHz. First order surge protection is provided via a pair of positive temperature coefficient high voltage thermistors and low capacitance gas discharge units (Bourns miniature 3-pole 230V discharge tubes that contain 2 tubes in one enclosure) that return to the circuit ground connection. During power surges, these discharge tubes turn on and maintain the voltage across them to below about 300 V and can momentarily absorb several thousand Amps. Any heating of the thermistors during a surge or other longer term anomalous high voltage event raises the thermistor resistance, further protecting the circuit. The voltage at the surge protectors is passed through a pair of high voltage capacitors to the primary of a high-frequency transformer. These capacitors were problematic in our prototypes as many high voltage capacitors do not exhibit acceptable behavior at high frequencies. We used polypropylene capacitors because they usually display a low loss tangent but we ultimately had to hand select part types based upon experimental measurements of the individual capacitors. We ultimately used 1600V (or higher) parts such as those available from BC Components in sizes of between 1 and 10 nF for our prototypes. The Minicircuits RF transformer (ADTT1-1) was a manufactured unit that was selected primarily for its frequency response range (<2 dB from 0.4-200 MHz) and the availability of center taps. It is adequate for both receiving and sending at less than 0.25 Watt but may be replaced for a more robust unit with higher power capability.

The secondary coil of the transformer is tied to a low capacitance (2 pF) transient voltage suppressor or TVS (Diodes Incorporated DLP05LC) that uses a fast responding diode and is biased off by a 3V local power connection (2 AA cells). This surge suppressor can momentarily shunt over 10 Amps which exceeds what we believe to be the likely maximum secondary surge current from the transformer. Finally, a ⅛ Amp microwave fuse is in series with the 50 Ohm BNC output connection that is floating relative to the primary or input ground connection. Although the circuit shown in FIG. 6 is functional, it has been found that in some implementations it may be difficult to locate adequate PTCs and using a simple resistor may result in a blown resistor (as later explained, placing a second set of capacitors to the left of the discharge tube appears to resolve any failure issues).

Figure 7:
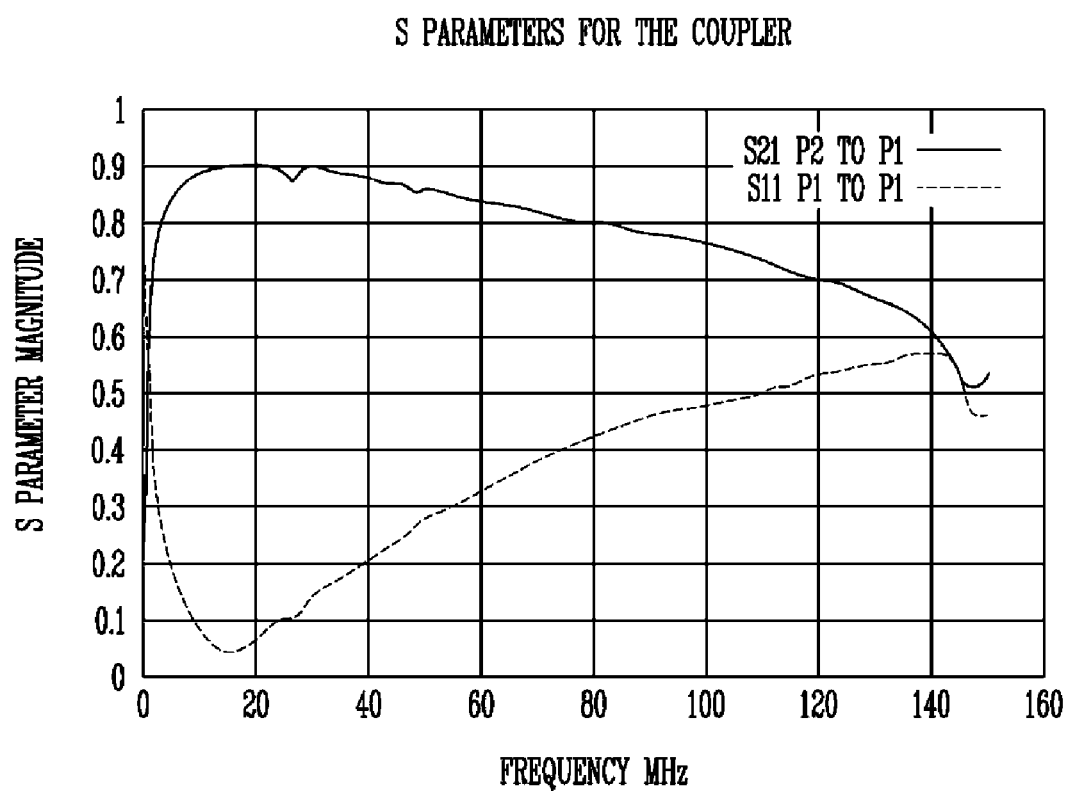
FIG. 7 illustrates measured $S_{21}$ and $S_{11}$ magnitudes for one embodiment of a powerline coupler.

Measured $S_{12}$ and $S_{11}$ parameters for this coupler are shown in FIG. 7. Note that for measurement of component S-parameters that are measured through the couplers, the coupler response is calibrated out. This is accomplished by performing short, open and through calibrations on the remote side of each coupler.

Figure 8:
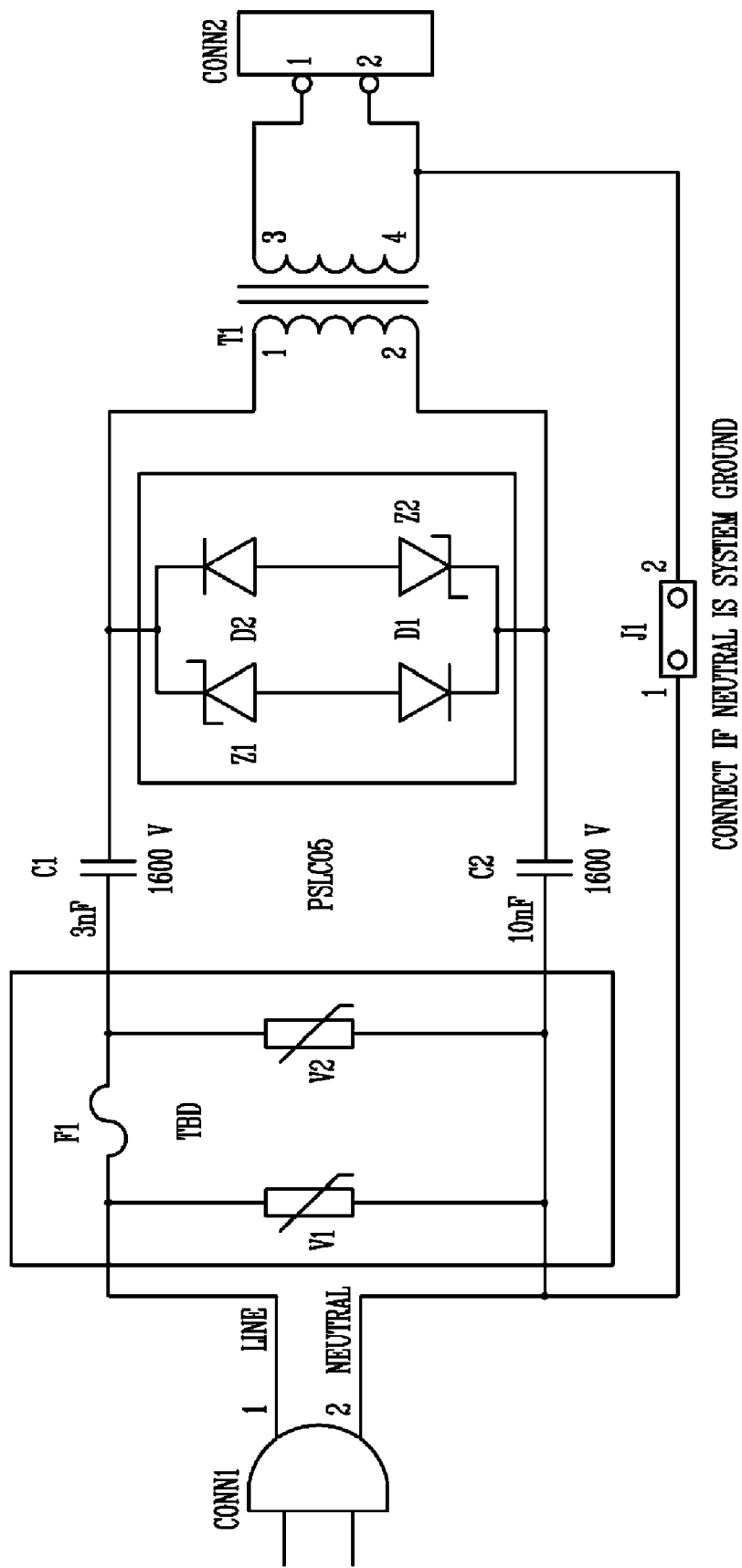
FIG. 8 is a schematic of an alternate embodiment of a powerline coupler.

An alternate circuit embodiment is shown in FIG. 8 where no gas discharge components are used but instead where surge protection is provided by bidirectional low capacitance semiconductor devices. In both embodiments shown in FIG. 7 and FIG. 8, surge protection of the transformer is enhanced by floating the transformer winding coupled to the power line between a pair of high voltage capacitors.

Figure 9:
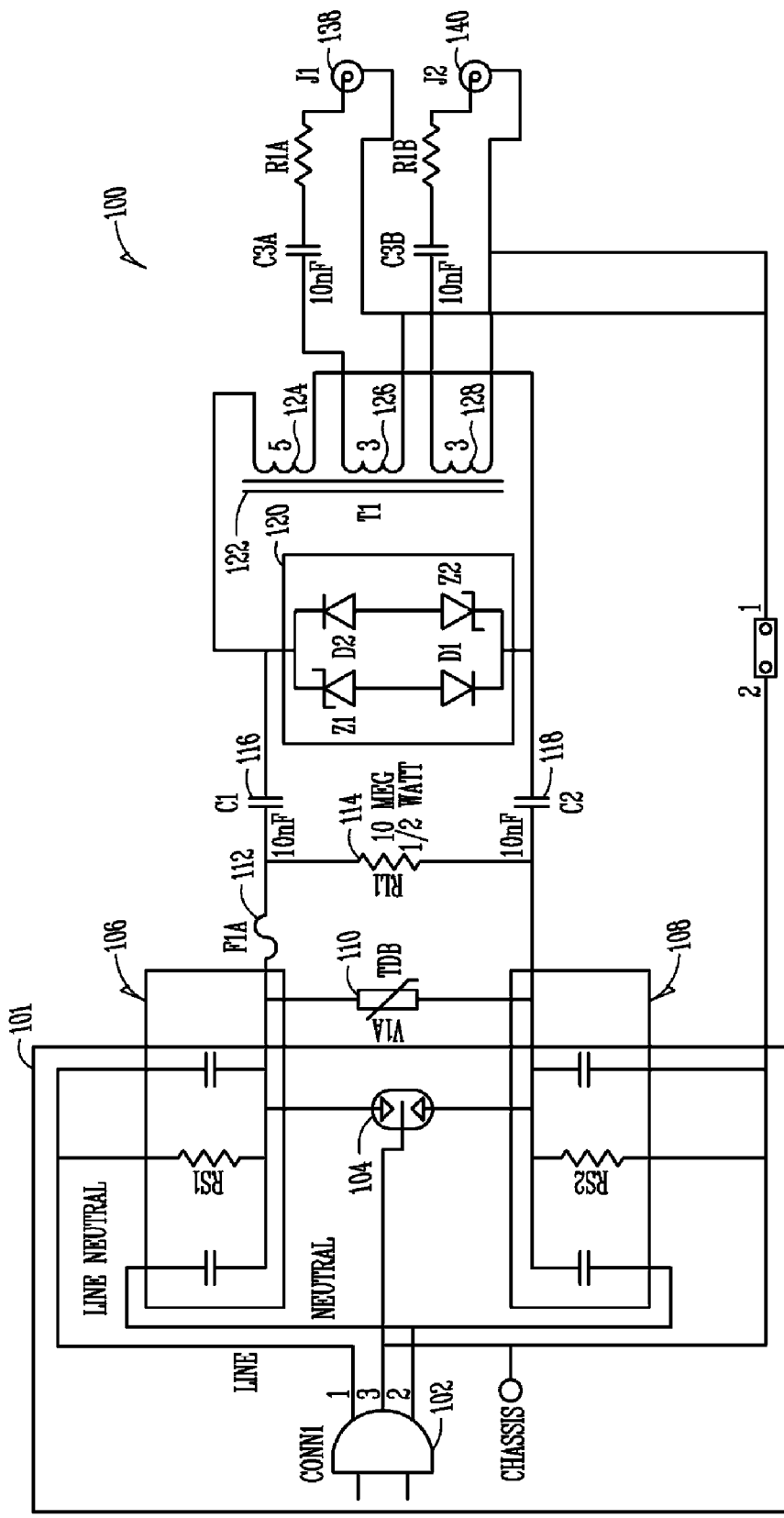
FIG. 9 is a schematic of another alternate embodiment of a powerline coupler.

Another alternative circuit embodiment is shown in FIG. 9. The circuit 100 includes a high voltage area 101. Within the high voltage area 101 is a connector 102 for the line, neutral, and ground. Sub circuits 106, 108 are shown. A gas discharge tube 104 is provided between the sub circuits. An optional MOV 110 is shown which may be used in place of the gas discharge tube. MOVs are generally less expensive than gas discharge tubes but have a higher parasitic capacitance and hence may not be usable at higher frequencies of use. A fuse 112 is provided to further protect the circuit. A resistor 114 and high voltage capacitors 116, 118 are shown. The gas discharge tube 104 limits the voltage across the transformer primary 124 and the high voltage capacitors 116, 118 connections without shorting the AC line. The gas discharge tube 104 is more likely to survive large surges than alternatives such as placing an MOV across the powerline. A fast semiconductor suppression device 120 is provided across the primary winding 124 of the transformer 122. The circuit 100 also includes internal bleed resistors in the sub circuits 106, 108 and resistor 114 which will remove charge from the capacitors when the circuit is unplugged from the wall and thereby prevent accidental discharge of the capacitors. The circuit 100 as shown illustrates multiple transformer secondary windings. Two are shown, but additional windings may be used. For explanation purposes, the primary 124 is the windings towards the AC line and the secondary are the windings 126, 128 towards the SMA connectors 138, 140. Instead of SMA connectors, a coax connection or other type of connection may be used. The circuit 100 may be programmed to connect to either the line voltage and neutral or the line voltage and ground. One or the other may be more effective.

Figure 10:
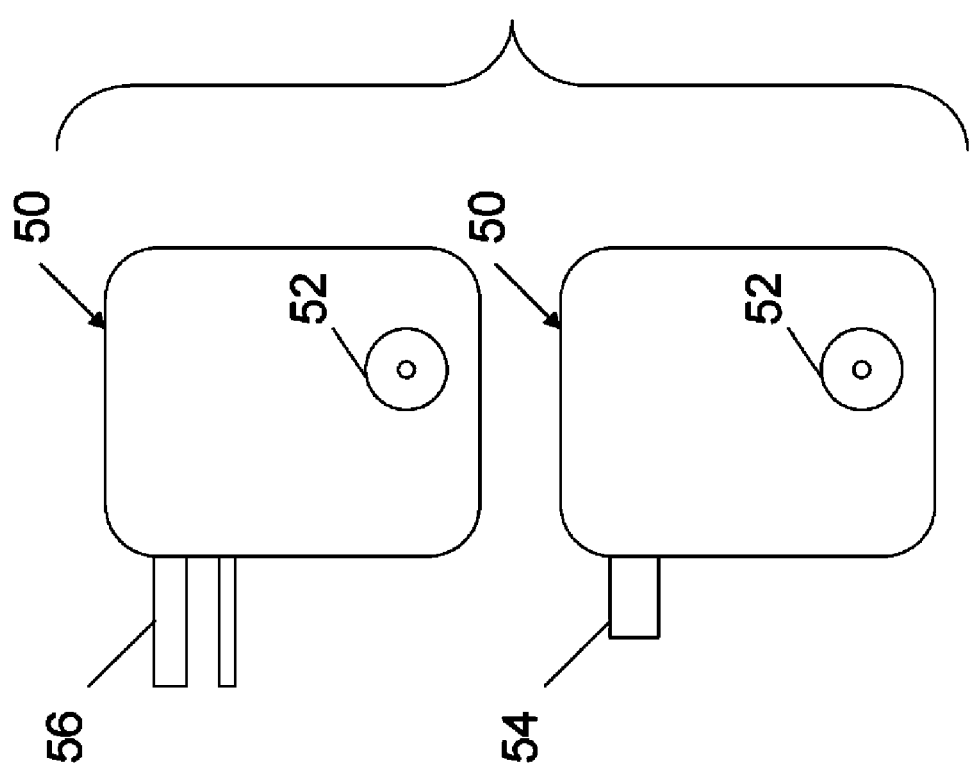
FIG. 10 is an illustration of one embodiment of a device with modular AC or RF connectors.

A further improvement on this scheme would be to have a 'clip-on' AC plug similar to that employed on the Linksys PAP2-NA AC adapter but where another clip-on module would consist of a BNC or other common RF plug-type that would allow for very simple calibration of the unit in the field. For example, instead of having a length of AC power cord, make the AC plug assembly modular with a BNC module that would attach to the same portal. There would then be no issue of calibration errors because of the short length of line cord (there would be none) and calibration would be very straight-forward via the modular BNC connector. FIG. 10 illustrates one such embodiment of such a device 50 where a modular BNC connector 54 (or other RF connector) may be snapped off and an AC compatible plug 56 snapped on. The device 50 includes an RF input/output 52 such as a BNC connector which may be mounted to the case or housing of the device 50. The modular BNC connector 54 and AC compatible plug 56 may be interchanged with a BNC or other RF connector for purposes of calibration or other purposes.

The system of the present invention allows for powerlines to be used in various ways. Power-lines may be used as communication medium for sensor related ad-hoc networks. The system may be used to operate across open circuit breakers and switches, different phases of transformers and even across distribution transformers. The present invention provides for wireless communication where powerlines are used as antenna. Conventional powerline frequencies may be used as well at much higher frequencies, including those over 100 MHz. In addition, it is to be understood that the present invention is not to be limited to a 120V, 60 Hz system. Other types of systems are contemplated, including 240V systems, and 230V 50 Hz systems. Also, wireless nodes and wired nodes may interoperate with each other using potentially the same signaling methods. These and other variations, alternatives, and options are within the spirit and scope of the invention.

Method for Powerline Communication Across Transformers, Open Circuit Breakers, and Other Devices Another aspect of the present invention relates to powerline communication across transformers, open circuit breakers, and other devices. The present inventor has found that signaling in one or more bands of frequency exhibits relatively low loss on real systems.

Figure 11:
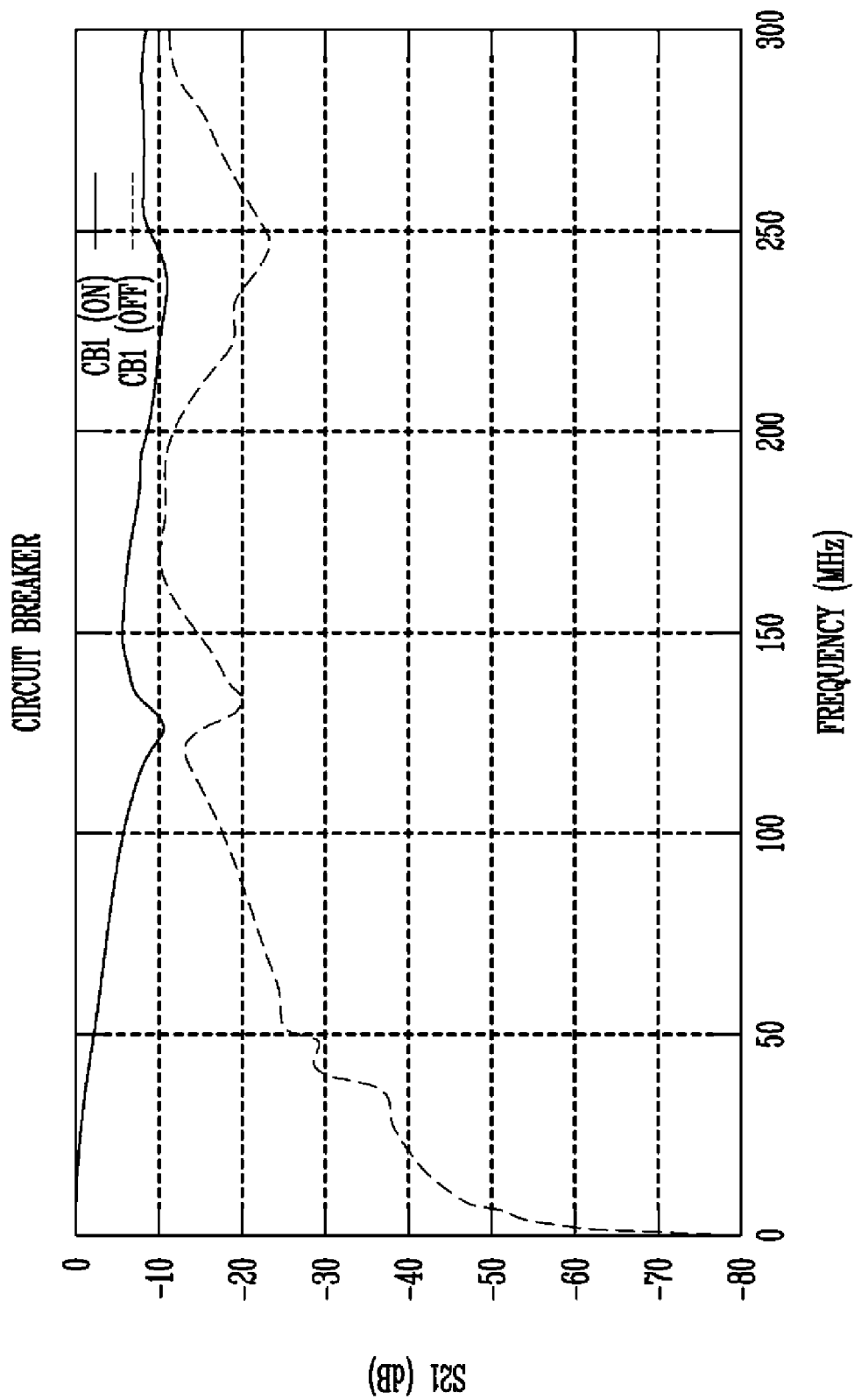
FIG. 11 is a graph illustrating the magnitude S21 response of a simple 15 Amp breaker shown for ON and OFF settings
Figure 12:
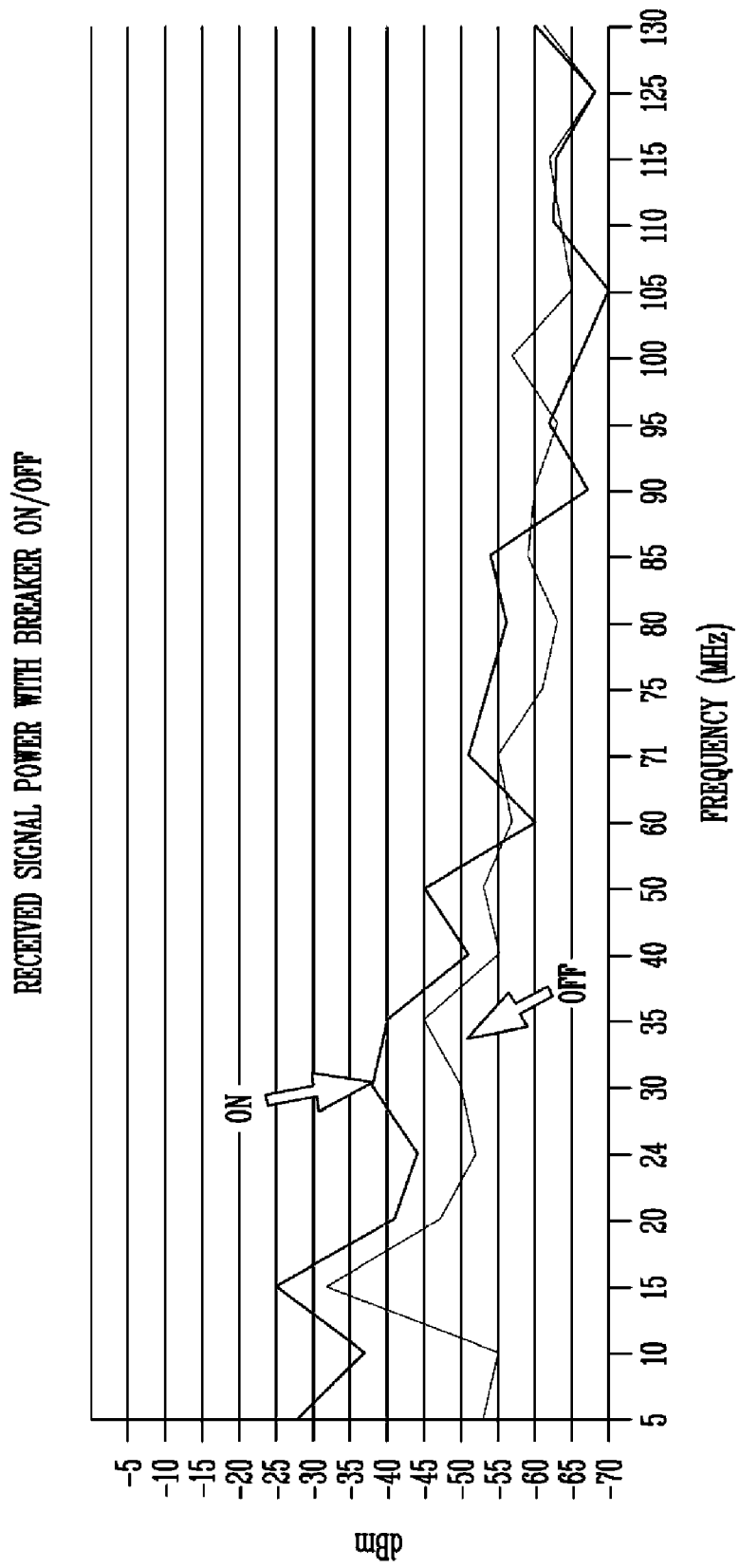
FIG. 12 is a graph illustrated measured receive power for a 10 dBm in-phase transmitter.

The frequency response of both individual circuit breakers and power networks containing them was measured. For example, FIG. 11 illustrates the magnitude S21 response of a simple 15 Amp breaker shown for ON and OFF settings. As is shown in FIG. 11, the difference between the ON and OFF responses is relatively small above about 100 MHz. Surprisingly, in a real network, this effect extends to much lower frequencies. Apparently because of radiated pickup within switchboxes and possibly transmission via the neutral line, significantly greater coupling occurs than could be easily inferred from measurements of the individual breakers. As an example of this, measured receive power for a nearby 10 dBm in-phase transmitter is shown in FIG. 12. Differences between the two curves are generally less than 10 dB above about 15 MHz! This suggests that optimal operating frequencies for systems that may have open circuit breakers are likely much lower than would be expected from individual breaker measurements as losses from power cables and transformers are generally smaller at lower frequencies.

Figure 13:
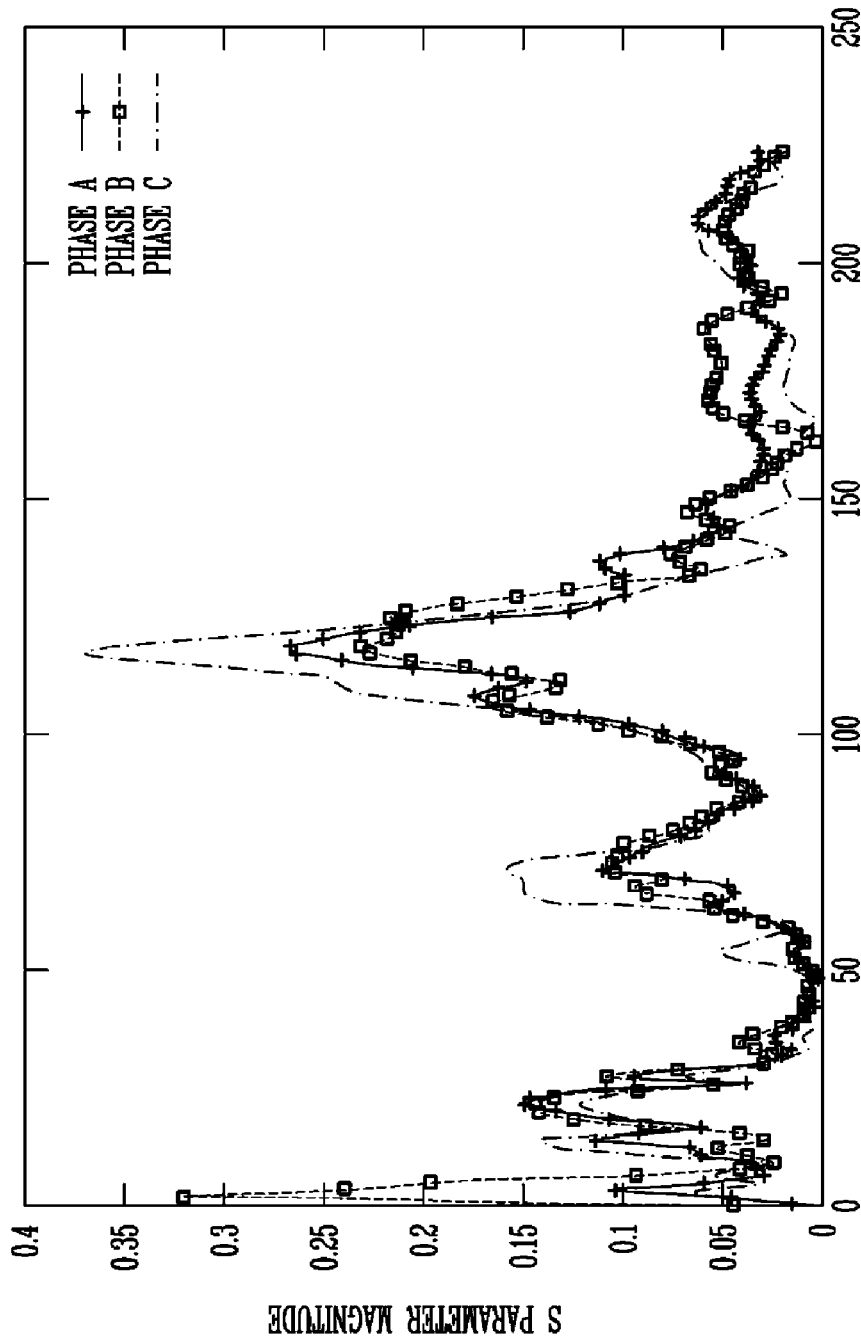
FIG. 13 is a graph of the magnitude of the forward S parameters from one primary to each of three secondary coils for a power transformer.

S-parameters have been measured for both pad and pole mounted distribution transformers. Apparently because of internal capacitance between windings and internal resonances, there is considerable transmission between phase terminals at some frequencies as shown in FIG. 13. Losses of as little as 10 dB are present at some frequencies although passage through two transformers will usually be required. The frequency response of distribution cable (used between transformers) has also been evaluated and has been shown to exhibit relatively little loss in comparison with the low-voltage cabling used within buildings. Hence, signaling across these barriers must be able to accommodate an additional 20+ dB of likely loss and be able to detect and use the relatively narrow resonant peaks.

One example, where communication needs to take place across multiple transformers is found in many large buildings. In such buildings, cascaded transformers are present. For example, one transformer may go from −13 kV to 480V and the second transformer may go from 480V to 120V. In such an instance communication across a 120V powerline may involve communication across two sets of the cascaded transformers. Of course, the present invention contemplates any number of combinations of transformers, open circuits, or other devices that may be associated with a powerline.

Transformer Reliability Assessment Via Broadband Power Line Noise Detection

Insight into powerline noise has applications beyond communications. One such application is assessment of transformer reliability using broadband power line noise detection. Degradation of a transformer dielectric is frequently characterized by low level arcing within the dielectric. This arcing is more prone to occur at times when the dielectric is stressed with a large potential placed across it. The arcing itself results in emission of broadband noise that to some degree will be transmitted to the primary and secondary feeds of the transformer. Because the timing of the emission is generally synchronized with the applied voltage, the noise due to this dielectric arcing may generally be separated from other broadband noise by comparing the detected signal components when the voltages are near their peaks and when they are of a significantly different potential. Noise sources that are not synchronized with the power line will have very similar signal powers during the two intervals. Differencing of RMS noise powers during the two intervals should give an indication of the relative magnitude of line voltage induced arching. Furthermore, for three phase transformers, the position of the failing dielectric may be inferred by the relative noise magnitudes as a function of where it occurs during the 360 degree phase cycle.

Thus, an understanding of powerline noise allows one to determine the usefulness of equipment of this type in predicting transformer failures based upon detection of high frequency noise emissions that are correlated with the power line voltages. Changes in S-parameter measurements over time may also be used for prediction of component failure if the pending failure or change in device characteristics results in a change in high frequency characteristics.

Beacon Using Powerline Antennas

Figure 14:
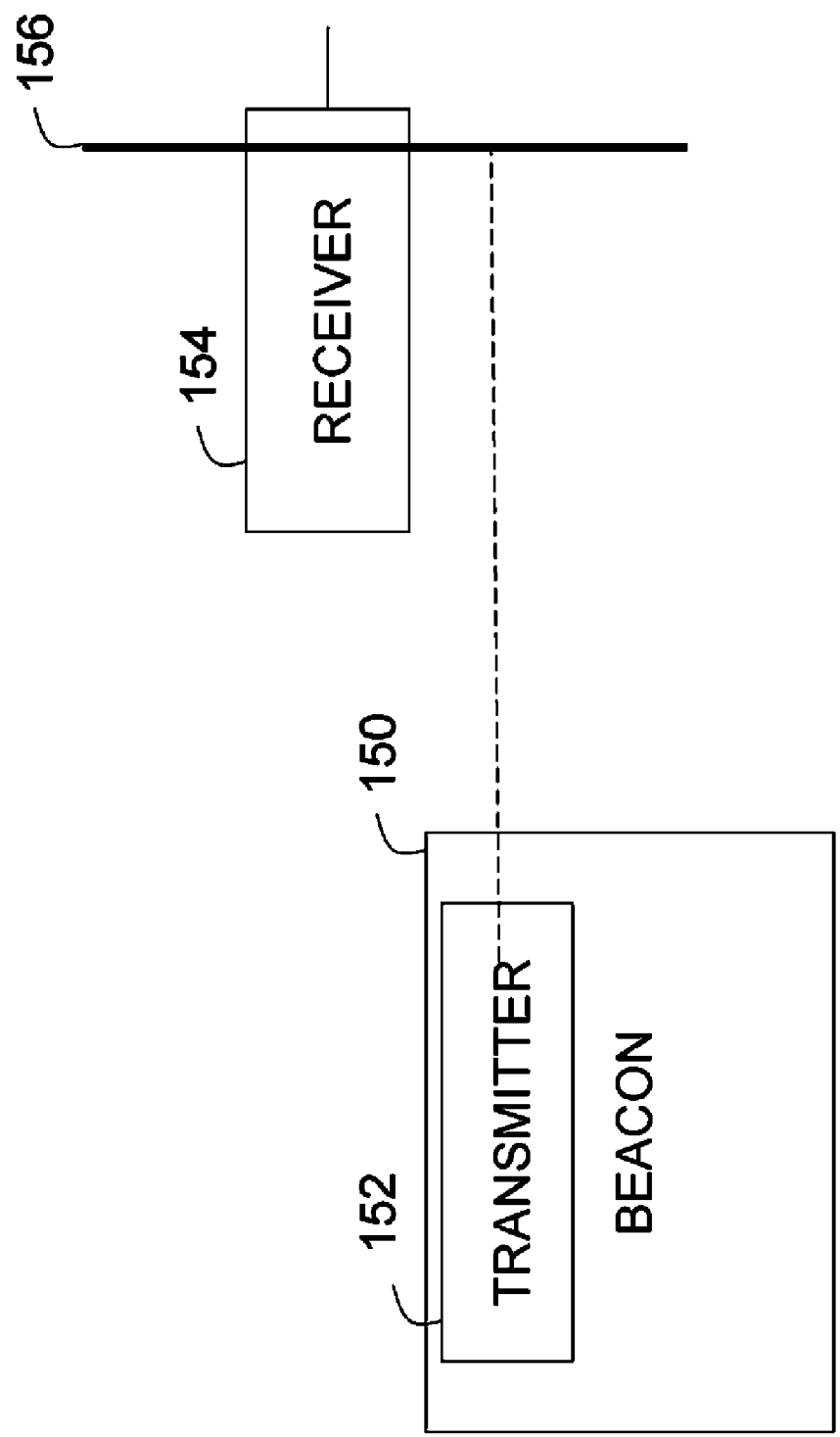
FIG. 14 provides a block diagram illustrating a beacon

By placing a small transmitter on a person or piece of equipment that transmits in the few hundred kHz to perhaps ~130 MHz, a signal that is unique to the person or equipment, the approximate location of the transmitter may be inferred based upon the signal received through the power line. This signal may be a periodically repeating beacon that only identifies the transmitter number or may also contain environmental or user entered data such as a text message. FIG. 14 provides a block diagram illustrating a beacon 150 with a transmitter 152. The transmitter is in an operative communication with a receiver 154 which is connected to a power line 156 which acts as a receiving antenna.

Figure 15:
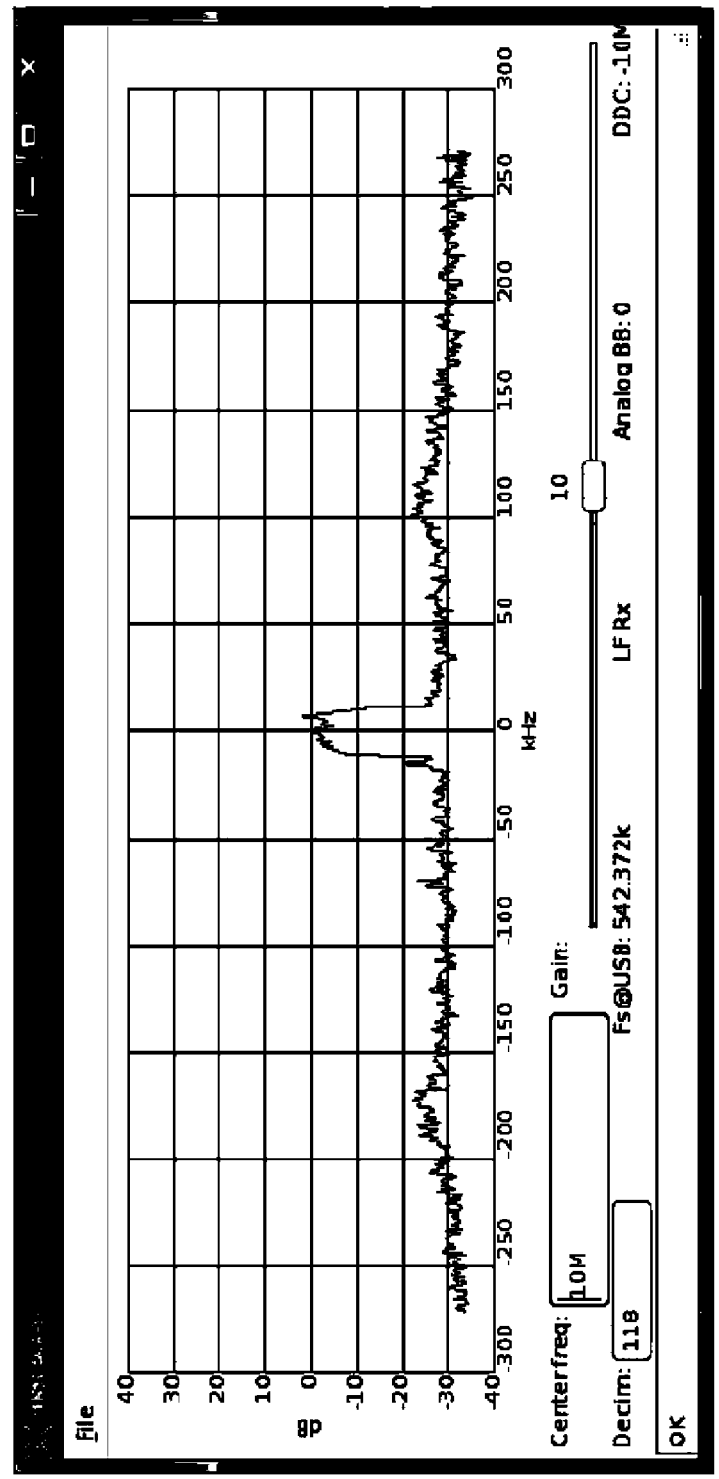
FIG. 15 illustrates a signal wirelessly transmitted to a receiver placed on a powerline.

An example of such as signal that was wirelessly transmitted to a receiver placed on the powerline is shown in FIG. 15. Here a 35 kb/s waveform using GMSK modulation is wirelessly transmitted at about 10 MHz to a receiver that is physically located some distance from the transmitter using the AC powerline as a receiving antenna. Although GMSK modulation is one type of modulation that may be used, other types of modulation as known in the art, may also be used.

Figure 16:
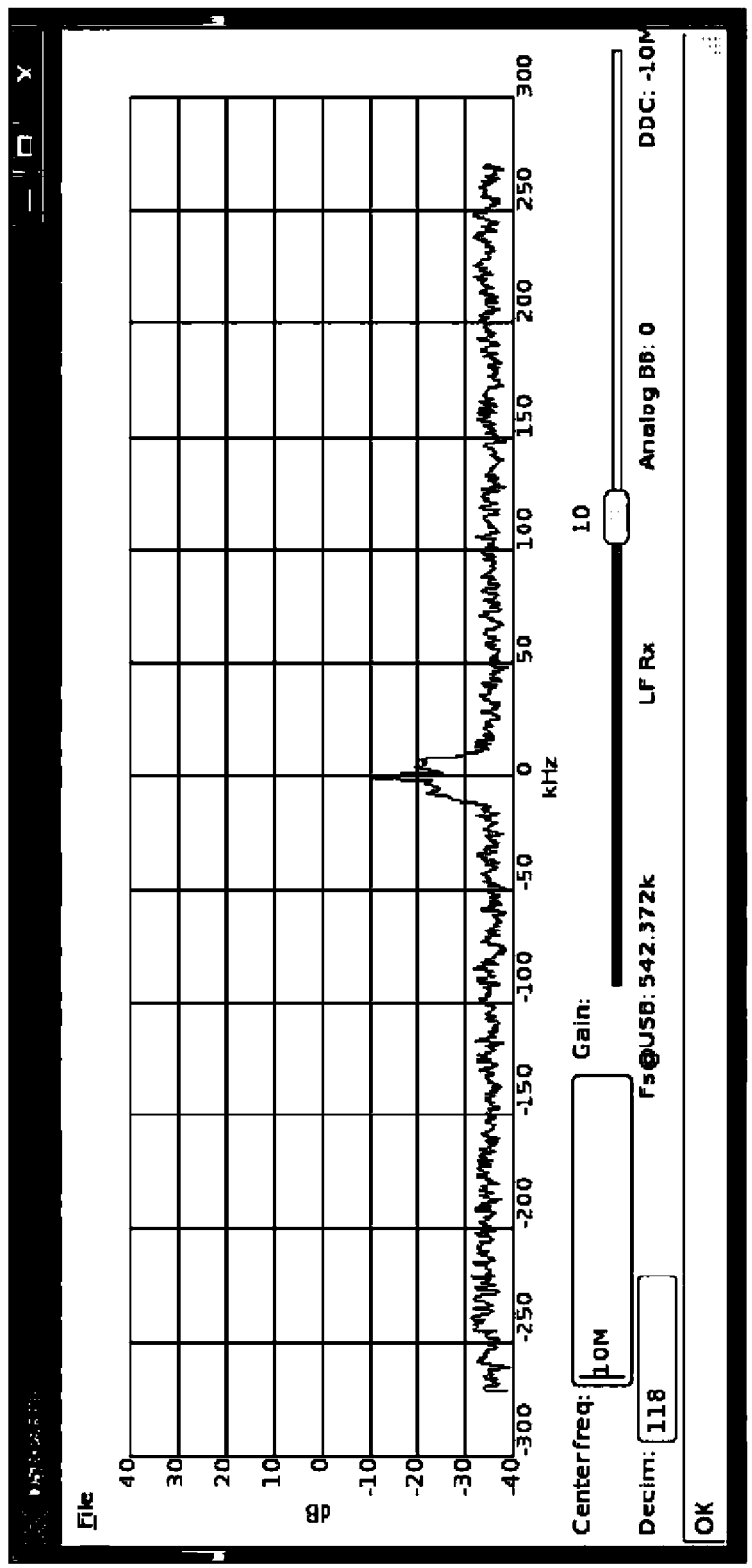
FIG. 16 illustrates a signal wirelessly transmitted to a receiver unplugged from the powerline.

The same signal with the receiver unplugged from the powerline is shown in FIG. 16. This signal is received via wireless transmission directly to the receiver unit with no powerline component. As can be seen by the difference between the two figures, the powerline significantly improves the signal reception. Thus, the present invention may be used in the context of receiving beacon transmissions and inferring information from the beacon transmissions, including location information. Information such as location information may be inferred in the same manner previously discussed in other applications by examining characteristics of the signal. Other approaches may be used. One approach would be to use multiple receivers, for example on each power phase or power segment. Each receiver could distinguish from which line the largest signal was coming from. For example, if each tunnel near the end of the mine had a receiver, one could determine which tunnel the beacon is in. Alternatively, several receivers may be placed in a line and one can look for the strongest signal. A more sophisticated approach would actually use temporal information and relative time of arrival in order to infer position. A third method would actually have the beacon act as a transponder that would transmit upon receiving an inquiry. In such an embodiment the beacon also contains a receiver. Of course, other approaches may be used. One example of where beacon based transmissions may be useful is underground, such as in mines.

One of the main advantages of using the powerline as a receiving antenna is that most powerlines are mechanically very rugged and will potentially survive structural collapses or failures in areas such as mines where the surrounding earth will largely preclude any direct wireless transmission over any length. A local receiver unit could be placed near the working areas of a mine and relay personnel or equipment information to the surface using either conventional network methods or powerline communications.

The present invention contemplates that various modulation schemes may be used, although preferred modulation schemes include direct sequence spread spectrum (DSSS) or differential quadrature phase shift keying (DQPSK). Where DQPSK is used, the bandwidth used may be only a few MHz wide or less and need only use a single or a few tones.

Thus, the present invention has been disclosed, including its various aspects relating to use of powerlines as antenna, communication over powerlines, using powerline antennas to receive beacon signals, and using high frequency impedance to determine information about devices on the powerlines. The present invention contemplates numerous options, variations, and alternatives, and is not to be limited to the specific details of the embodiments set forth herein.

What is claimed is:

1. A method of wireless communication, comprising:
  receiving a wirelessly transmitted radio signal at a powerline adapted for conveying an alternating current power signal wherein the powerline functions as a receiving antenna for the wirelessly transmitted radio signal;
  coupling the powerline to an input of a radio receiver using a coupler to communicate the radio signal to the radio receiver;
  wherein the coupler provides for blocking the alternating current power signal while limiting radio frequency loss and providing surge protection; sending a second radio signal from a radio transmitter through the coupler and to the powerline wherein the powerline functions as a sending antenna for the second radio signal.

2. The method of claim 1 further comprising calibrating the radio receiver for use with the powerline by comparing performance of the powerline with a second antenna.

3. The method of claim 1 wherein the alternating current power signal is from the set consisting of an approximately 120 volt alternating current power signal, an approximately 240 volt alternating current power signal, and an approximately 230 volt alternating current power signal.

4. The method of claim 1 wherein the alternating current power signal has a frequency selected from the set of approximately 60 Hz and approximately 50 Hz.

5. The method of claim 1 wherein the wirelessly transmitted radio signal has a frequency from the group consisting of at least 1 MHz, at least 10 MHz, at least 100 MHz.

6. The method of claim 1 wherein the coupler further comprises:
  a transformer having a primary winding and at least one secondary winding, the primary winding coupled to the powerline;
  a pair of high voltage capacitors, wherein the primary winding floats between the pair of high voltage capacitors to thereby assist in providing the surge protection;
  a gas discharge tube electrically connected to the transformer primary winding for limiting voltage across the transformer primary winding and the pair of high voltage capacitors to thereby further assist in providing the surge protection.

7. The method of claim 1 wherein the radio frequency loss being limited to less than about −30 db.

8. The method of claim 1 wherein the step of receiving is performed using subsampling reception techniques.

9. The method of claim 1 wherein the step of receiving a wirelessly transmitted radio signal is performed while the powerline provides an alternating current power signal.

10. The method of claim 1 wherein the step of receiving a wirelessly transmitted radio signal is performed while the powerline is not providing an alternating current power signal.

11. The method of claim 1 wherein the wirelessly transmitted radio signal is a beacon signal from a location and wherein the method further comprises determining the location.

12. The method of claim 1 wherein the powerline comprises a cable with multiple conductors.

13. The method of claim 1 wherein the powerline comprises a shielded cable.

14. A system, comprising:
a radio receiver having an input;
a line coupler electrically connected to the a power line, the power line providing an alternating current line level voltage and wherein the powerline functions as an antenna for the radio receiver;
wherein the line coupler provides for blocking the alternating current line level voltage while limiting radio frequency loss and providing surge protection; wherein the radio receiver further comprises a second input and an antenna electrically connected to the second input of the radio receiver to thereby provide data for use in calibration.

15. The system of claim 14 further comprising:
a radio transmitter having an output;
a power amplifier electrically connected to the output of the radio transmitter and the line coupler and wherein the power line function as an antenna for the radio transmitter.

16. The system of claim 14 further comprising an AC adapter housing adapted for providing a plug-in connection to the powerline and providing a radio plug connector.

17. The system of claim 16 wherein the radio plug connector is a BNC connector.

18. A system, comprising:
a radio transmitter having an output;
a line coupler electrically connected to the transmitter output and to a power line, the power line providing an alternating current line level voltage and wherein the powerline functions as an antenna for the radio transmitter; and
wherein the line coupler provides for blocking the alternating current line level voltage while limiting radio frequency loss and providing surge protection; wherein the radio receiver further comprises a second input and an antenna electrically connected to the second input of the radio receiver to thereby provide data for use in calibration.

19. The system of claim 18 further comprising an AC adapter housing adapted for providing a plug-in connection to the powerline and providing a radio plug connector.

20. The system of claim 19 wherein the radio plug connector is selected from a BNC connector, an SMA connector, an SMB connector, and an RF connector.

\* \* \* \* \*